G. Gilbert,
Fly Trap,
№ 15,848. Patented Oct. 7, 1856.

UNITED STATES PATENT OFFICE.

GEO. GILBERT, OF WESTVILLE, CONNECTICUT.

FLY-TRAP.

Specification of Letters Patent No. 15,848, dated October 7, 1856.

*To all whom it may concern:*

Be it known that I, GEORGE GILBERT, of Westville, in the county of New Haven and State of Connecticut, have invented a new and useful Improvement in Fly-Traps; and I do hereby declare that the following is a full, clear, and exact description of the construction, character, and operation of the same, reference being had to the accompanying drawings, which make a part of this specification, in which—

Figure 2:
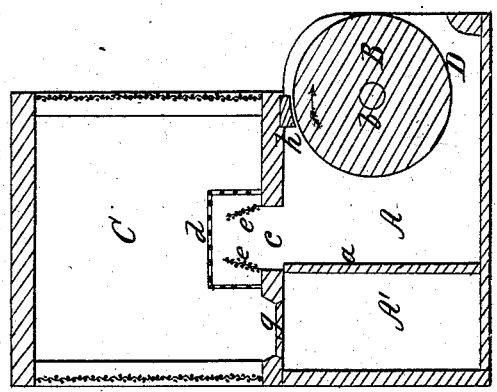
Figure 1:
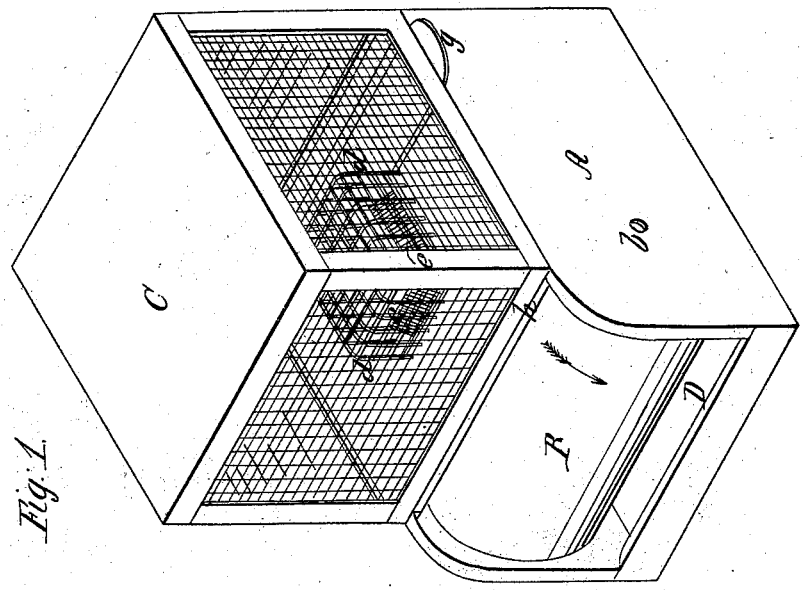

Figure 1 is a perspective view of the whole apparatus. Fig. 2 is a section of the same, cut vertically through the center.

My improvement consists in using a revolving cylinder, on which I put the bait, (as molasses,) to attract the flies, and while they are feeding the revolving motion of the cylinder will carry them quietly into a dark chamber, from which they will naturally pass up, through a screen, into a light chamber which is inclosed by wire gauze, and will thus be securely caged, to be dealt with at pleasure.

I make the box A, Fig. 1, and divide it into two parts, A and A', Fig. 2, by an upright partition, as shown at $a$, Fig. 2, to make a close chamber of it. In the front part of this box A I fit a cylinder, B, Figs. 1 and 2, with its journals resting in suitable bearings, as at $b$, Fig. 1. This cylinder I revolve by clockwork or any other convenient means. On the box A, I place another box, C, the sides of which I make of wire gauze to admit the light, and yet too fine to allow the flies to pass through its meshes, to escape. In the central part of the bottom of this box, C, I cut a hole or aperture $c$, through which the flies can pass from the dark chamber A to the light chamber, C, as shown in Fig. 2. I cover or inclose this hole, $c$, with a frame or screen of wire, $d$, made coarse enough to allow the flies an easy passage through it into the light chamber C, and inside of this frame, $d$, and immediately on the border of the hole, $c$, (so as to perfectly inclose it,) I fit a screen of fine wire gauze, of a pyramidal form, as seen at $e, e$, Figs. 1 and 2, to render a return to the dark chamber A difficult, while it will not impede their passage upward. In the back part of the box C, I fit a slide $g$, Figs. 1 and 2, by which I open or close the passage into the back chamber A' in the lower box, into which the flies may be driven, by shaking the box or otherwise, and then shut up so close, without air or light that they will soon die.

The upper box, C, may be readily taken off to empty out the flies from the chamber A' or for any other purpose, when necessary.

Having made and arranged the several parts as described, and applied the proper motive power to the cylinder, I smear, or cover, the convex surface of the cylinder, B, with molasses, or other suitable substance, to attract the flies, and place the trap on a table, or any other suitable place, for the flies to visit. When the flies light on the surface of the cylinder, and are feeding, the cylinder, revolving in the direction indicated by the dart, will carry them through the open space shown at D, Figs. 1 and 2, and when they arrive near the top of the cylinder the bar, $h$, will brush them off, and as they can see no light except that in the upper chamber, C, to that they will, naturally, be attracted, when they will pass upward through the meshes of the screen, $d$, and will not attempt to return, as there is no light below; and if they should attempt it, they would be much impeded by screen, $e, e$, which would not be easy for them to pass.

I disclaim the use of floats, ledges, or any other projections on the surface of the cylinder; and I also disclaim the use of a movable cleaner, or wiper, of any description whatever, to remove the flies from the surface of the cylinder, or to force them into the box, or any other receptacles, as neither projections, nor cleaners, are needed, or used, in any manner of constructing and using the fly trap.

What I claim as my invention and desire to secure by Letters Patent, is—

The combination of the revolving cylinder with the screens, or wirework, when the whole is constructed, arranged, and combined, substantially, as herein described.

GEO. GILBERT.

Witnesses:
CHARLES HALLOCK,
R. FITZGERALD.